(12) United States Patent
Uhrig et al.

(10) Patent No.: US 11,518,251 B2
(45) Date of Patent: Dec. 6, 2022

(54) DEVICE AND METHOD FOR ADAPTING A DIRECT CURRENT INTERMEDIATE CIRCUIT BY VARYING THE VOLTAGE AND ADAPTING THE PHASE NUMBER OF A DC/DC CONVERTER

(71) Applicant: Vitesco Technologies GmbH, Hannover (DE)

(72) Inventors: Florian Uhrig, Munich (DE); Martin Brüll, Munich (DE)

(73) Assignee: Vitesco Technologies GmbH

( * ) Notice: Subject to any disclaimer, the term of this patent is extended or adjusted under 35 U.S.C. 154(b) by 107 days.

(21) Appl. No.: 17/262,953

(22) PCT Filed: Jul. 24, 2019

(86) PCT No.: PCT/EP2019/069961
§ 371 (c)(1),
(2) Date: Jan. 25, 2021

(87) PCT Pub. No.: WO2020/020968
PCT Pub. Date: Jan. 30, 2020

(65) Prior Publication Data
US 2021/0162870 A1    Jun. 3, 2021

(30) Foreign Application Priority Data

Jul. 26, 2018  (DE) ..................... 10 2018 212 463.9

(51) Int. Cl.
*B60L 15/00*  (2006.01)
*H02M 1/00*  (2006.01)

(52) U.S. Cl.
CPC ......... *B60L 15/007* (2013.01); *B60L 2210/10* (2013.01); *B60L 2210/14* (2013.01);
(Continued)

(58) Field of Classification Search
CPC ............... B60L 15/007; B60L 2210/10; B60L 2240/527
See application file for complete search history.

(56) References Cited

U.S. PATENT DOCUMENTS 5,099,186 A * 3/1992 Rippel .................... B60L 3/003
                                                              318/803
8,728,678 B2   5/2014 Hasegawa
(Continued)

FOREIGN PATENT DOCUMENTS

DE     112008003478 B4    8/2013
JP        2018014855 A    1/2018
(Continued)

OTHER PUBLICATIONS

Zivanov et al., "Desing of Multiphase Boost Converter for Hyrid Fuel Cell/Battery Power Sources", Paths to Sustainable Energy, InTech, 2010, pp. 359-404.
(Continued)

*Primary Examiner* — Adam D Houston
(74) *Attorney, Agent, or Firm* — RatnerPrestia

(57) ABSTRACT

An intermediate circuit adaptation device for a vehicle. The intermediate circuit adaptation device includes a DC intermediate circuit with at least two phases and a control unit. The control unit is configured to change the intermediate circuit voltage and/or the number of phases of the intermediate circuit on the basis of the current operating point.

13 Claims, 3 Drawing Sheets

(52) U.S. Cl.
CPC ..... *B60L 2210/40* (2013.01); *B60L 2240/527* (2013.01); *H02M 1/0048* (2021.05)

(56) References Cited

U.S. PATENT DOCUMENTS

| | | | |
|---|---|---|---|
| 10,562,404 B1* | 2/2020 | Khaligh | H02M 1/44 |
| 11,390,179 B2* | 7/2022 | Bin | H02M 7/53871 |
| 2010/0118571 A1* | 5/2010 | Saint-Pierre | H02M 1/4225 |
| | | | 363/89 |
| 2013/0029240 A1 | 1/2013 | Hasegawa et al. | |
| 2018/0154787 A1 | 6/2018 | Chen et al. | |
| 2019/0031125 A1* | 1/2019 | Rozman | B60L 53/20 |
| 2019/0047433 A1* | 2/2019 | Rozman | B60L 58/12 |
| 2020/0103705 A1* | 4/2020 | Chen | H05B 45/32 |
| 2020/0105185 A1* | 4/2020 | Chen | F21S 4/20 |
| 2021/0061113 A1* | 3/2021 | Ellis | B60L 53/66 |
| 2021/0351178 A1* | 11/2021 | Wood | H01L 27/082 |
| 2022/0224364 A1* | 7/2022 | Kim | H04B 1/1615 |

FOREIGN PATENT DOCUMENTS

| | | | | |
|---|---|---|---|---|
| KR | 1020150134922 A | | 12/2015 | |
| KR | 20200083789 A | * | 7/2020 | |
| KR | 2021064546 A | * | 6/2021 | ............. B60L 50/70 |
| KR | 20210064706 A | * | 6/2021 | |
| KR | 20220096817 A | * | 7/2022 | |
| WO | WO-2019224165 A1 | * | 11/2019 | .......... H02M 3/1584 |
| WO | WO-2021165654 A1 | * | 8/2021 | ............. B60L 50/60 |

OTHER PUBLICATIONS

International Search Report and Written Opinion for International Application No. PCT/EP2019/069961. dated Oct. 8, 2019, 9 pages.
International Search Report and Written Opinion for International Application No. PCT/EP/2019/069961, dated Oct. 8, 2019, 16 pages (German).
Korean Notice to Submit Response for Korean Application No. 10-2021-7005714, dated Jul. 29, 2022 with translation, 11 pages.

* cited by examiner

DEVICE AND METHOD FOR ADAPTING A DIRECT CURRENT INTERMEDIATE CIRCUIT BY VARYING THE VOLTAGE AND ADAPTING THE PHASE NUMBER OF A DC/DC CONVERTER

CROSS REFERENCE TO RELATED APPLICATIONS

This application is the U.S. National Phase Application of PCT International Application No. PCT/EP2019/069961, filed Jul. 24, 2019, which claims priority to German Patent Application No. 10 2018 212 463.9, filed Jul. 26, 2018, the contents of such applications being incorporated by reference herein.

FIELD OF THE INVENTION

The invention relates to an intermediate circuit adaptation device for a vehicle, a vehicle with an intermediate circuit adaptation device, and a method for changing the intermediate circuit voltage and/or the number of phases.

BACKGROUND OF THE INVENTION

Increased environmental awareness and higher demands on consumption, $CO_2$ emissions and other emissions have led in recent years to new driver assistance systems and numerous new driving functions. Electric vehicles are furthermore increasingly being developed and sold in order to reduce the output of $CO_2$ further. These, however, have a limited range and long charging processes. The components, such as the battery and motor, must moreover be cooled in order to dissipate the power loss, which however requires additional electrical energy. By reducing the losses in the electrical system, the range can be increased and, at the same time, the need for cooling reduced, which leads to a reduction in weight and a further increase in the range.

SUMMARY OF THE INVENTION

An aspect of the invention aims to increase the efficiency of the electrical drivetrain and to reduce the losses in the intermediate circuit.

A first aspect of the invention relates to an intermediate circuit adaptation device for a vehicle. The intermediate circuit adaptation device comprises a DC intermediate circuit with at least two phases and a control unit. The control unit is configured to change the intermediate circuit voltage and/or the number of phases of the intermediate circuit on the basis of the current operating point.

The intermediate circuit voltage and the number of phases of a DC intermediate circuit with at least two parallel phases can be changed to reduce the losses in the intermediate circuit and thus to increase the efficiency of the intermediate circuit. The change to the intermediate circuit voltage and the number of phases can be carried out here by an intermediate circuit adaptation device, depending on the current or expected operating point. At the current operating point a load with a low power requirement can for example be connected to the intermediate circuit so that in order to reduce the losses the intermediate circuit voltage can be reduced (reduction of voltage-dependent losses) and that the number of phases can be reduced (reduction in the phase/current-dependent losses).

Multiple parallel phases are employed or installed in the electrical system so that the individual components can be smaller and the electrical system can be scaled more flexibly (construction kit). Costs can also be reduced through the larger piece counts of the smaller components. In addition to the intermediate circuit, the intermediate circuit adaptation device furthermore comprises a control unit. This control unit can change the intermediate circuit voltage and/or the number of phases depending on the current operating point. The change to the intermediate circuit voltage can take place here continuously or in fixed voltage steps.

The operating point can here comprise a power of the load, a dynamic performance, a peak current, a minimum intermediate circuit voltage of the load or, however, also a temperature, a cooling power or a heating power.

The load can be an electrical consumer connected to the intermediate circuit, such as a rectifier, converter or inverter (for an electric motor), or can also however be a heater or a cooling system.

In the context of this application, phases refers to current-carrying cables in a DC/DC or direct voltage converter.

It is to be noted that current-dependent losses can occur in each phase. The more current flows in each of the phases, the higher the losses can be. The current-dependent losses are, furthermore, related quadratically to the current, $P=R*I^2$, where R is the cable resistance and P is the power loss. Voltage-dependent losses also occur, in particular in the voltage conversion, in addition to the current-dependent losses. The higher the intermediate circuit voltage, the higher can the losses be in the voltage conversion from a battery or fuel-cell voltage up to the intermediate circuit voltage. These losses can be minimized by the change to the intermediate circuit voltage and the number of phases.

According to one form of embodiment, the current operating point takes a load connected to the intermediate circuit into consideration. The operating point can here comprise a power, a dynamic performance, a peak current, a minimum intermediate circuit voltage of the load or, however, also a temperature, a cooling power or a heating power.

According to one form of embodiment, the control unit is configured to change the intermediate circuit voltage to a value between 250 V and 800 V. It is to be noted that the range of the intermediate circuit voltage can also extend from 250 V to 450 V, or from 400 V to 1000 V.

According to a further form of embodiment, the control unit is configured to change the intermediate circuit voltage in steps. The intermediate circuit voltage can here be changed in predefined, fixed steps. The number of changes can thus be reduced, since the steps have a certain degree of fluctuation or reserve.

According to one form of embodiment, the step height of the stepwise change in the intermediate circuit voltage is 25 V. Alternatively or in addition, the step height can also be 20 V, 30 V or 50 V. Alternatively or in addition, the step height can also be varied, so that in a medium voltage range a lower step height, for example 10 V, and in the low or high voltage ranges a higher step height, for example 30 V, is present. A relevant range can thus be graduated more finely than a peripheral range.

According to one form of embodiment, the control unit is configured to change the intermediate circuit voltage continuously. In other words, the control unit can change the intermediate circuit voltage to any arbitrary value between the two limit values, for example 250 V and 800 V. A maximum flexibility and an optimum reduction in the power loss can be achieved with this.

According to one form of embodiment, the control unit is configured to first vary the intermediate circuit voltage and then to change the number of phases. The optimum intermediate circuit voltage and the optimum number of phases for the current operating point can thus be determined quickly, dynamically and efficiently.

According to one form of embodiment, the intermediate circuit comprises four phases. The control unit is configured to lower the intermediate circuit voltage and/or to reduce the number of phases when the load connected to the intermediate circuit falls below a first, predefined threshold value, and the control unit is configured to raise the intermediate circuit voltage and/or to increase the number of phases when the load connected to the intermediate circuit exceeds a second, predefined threshold value.

It is to be noted that the first threshold value and the second threshold value can be absolute, relative, or percentage threshold values. A phase can, for example, be switched on when the power of the current operating point lies 15% above the previous operating point.

According to one form of embodiment, the control unit is configured to change the intermediate circuit voltage and/or the number of phases of the intermediate circuit on the basis of an expected operating point. A predictive or preventive change to the intermediate circuit voltage and the number of phases can thus take place. It can in this way be ensured that sufficient power can always be made available to the connected load. In particular when the vehicle comprises partially or fully automated driving functions (longitudinal vehicle guidance), the intermediate circuit voltage and the number of phases can be changed on the basis of an expected operating point. It can, for example, be known to an autopilot or to a navigation unit of a vehicle that the vehicle will soon reach a freeway entrance where it will have to accelerate strongly. The intermediate circuit voltage can thus be raised, and phases switched on, in advance. The acceleration can thus take place without delay.

According to one form of embodiment, the intermediate circuit adaptation device further comprises a voltage sensor for acquisition of the intermediate circuit voltage. The current intermediate circuit voltage can always be acquired in this way, and a regulation to the desired intermediate circuit voltage can be carried out by the control unit.

According to one form of embodiment, the control unit is configured to change a switching frequency of a rectifier, converter or inverter that is connected to the intermediate circuit depending on the current operating point.

In addition to the intermediate circuit voltage and the number of phases, the control unit can also change or adapt the switching frequencies of inverters, converters or rectifiers that are connected to the intermediate circuit on the basis of the current operating point. The efficiency of the electrical system can thus be further increased. The switching frequency can additionally be reduced at an operating point with low power. At higher powers, or in the event of higher dynamic requirements (fast changes of the intermediate circuit voltage), the switching frequency of the rectifiers, converters or inverters that are connected to the intermediate circuit can be raised.

A further aspect of the invention relates to a method for changing an intermediate circuit voltage and/or a number of phases. The method has the following steps of:
- acquiring an intermediate circuit voltage;
- determining a current operating point;
- changing the intermediate circuit voltage depending on the current operating point; and
- changing the number of phases of the intermediate circuit depending on the current operating point.

It is to be noted that the individual steps of the method can be carried out in a loop, so that a continuous change or adaptation of the intermediate circuit voltage and/or of the number of phases occurs.

Another aspect of this invention relates to a vehicle having an intermediate circuit adaptation device as described above and below.

The vehicle is, for example, a motor vehicle, such as a car, a bus or a truck, or else also a rail vehicle, a ship, or an aircraft such as a helicopter or an airplane.

A further aspect of the invention relates to a program element that, when executed on a control unit of an intermediate circuit adaptation device, instructs the intermediate circuit adaptation device to perform the method described above and below.

A further aspect of the invention relates to a computer-readable medium on which a program element is stored which, when executed on a control unit of an intermediate circuit adaptation device, instructs the intermediate circuit adaptation device to perform the method described above and below.

BRIEF DESCRIPTION OF THE DRAWINGS

Further features, advantages and possible uses of aspects of the invention emerge from the following description of the exemplary embodiments and figures.

The figures are schematic and not to scale. When the same reference signs are specified in the following description in various figures, they denote identical or similar elements.

DETAILED DESCRIPTION OF THE PREFERRED EMBODIMENTS

Figure 1:
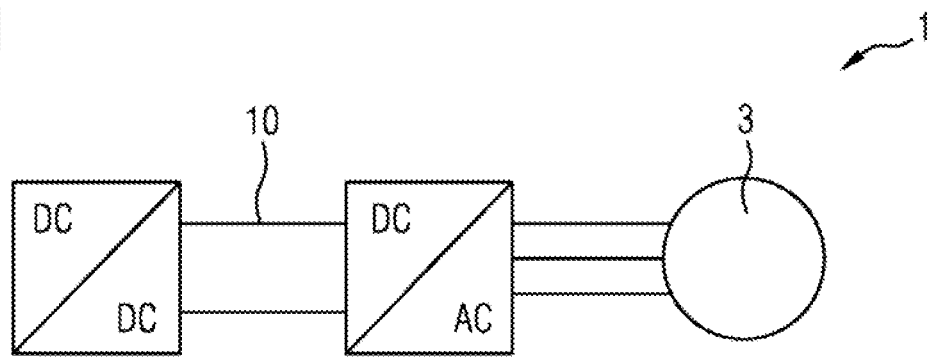
FIG. 1 shows a block diagram of an intermediate circuit with an intermediate circuit adaptation device and a load according to one form of embodiment.

FIG. 1 shows an intermediate circuit 10. This intermediate circuit 10 is a DC intermediate circuit comprising at least two parallel phases. FIG. 1 further shows an inverter that is connected to the intermediate circuit 10. A load 3, such as for example an electric motor that is configured to propel a vehicle, is connected to this inverter. The voltage of the intermediate circuit 10 can be changed here, i.e. how many strings current is transmitted to. The number of phases can furthermore be changed. These two changes can take place depending on the current operating point, for example on the power requested, the minimum voltage and the dynamic performance. Sufficient power for the load 3 connected to the intermediate circuit 10 can thus always be provided, without the losses becoming unnecessarily high. The increases in efficiency resulting from the intermediate circuit adaptation device can amount to up to 5% in the WLTP (worldwide harmonized light vehicles test procedure). The intermediate circuit voltage and the number of phases can here be changed, adapted or varied on the basis of the current operating point or (preventively) on an expected operating point. For example, it is possible that the vehicle (navigation module) recognizes that a great deal of power will soon be required at the electric motor (entering a freeway), and additional phases can accordingly be switched on in advance, and the intermediate circuit voltage can be increased. The preventive change to the intermediate circuit voltage and the number of phases can in particular be helpful in partially or fully automated vehicles, since the information for the longitudinal vehicle guidance and the vehicle control is already present in the vehicle, and the behavior of the driver does not have to be considered. The intermediate circuit adaptation device 1 can provide that the intermediate circuit voltage is changed, varied or adapted first, since this can be changed more quickly, dynamically and easily, and that the number of phases is changed, varied or adapted subsequently.

Figure 2:
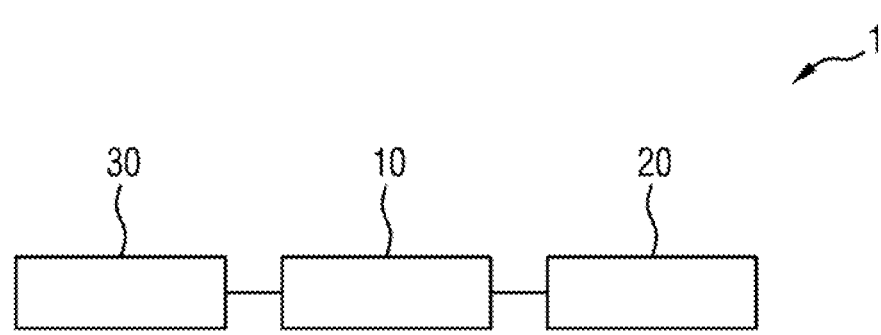
FIG. 2 shows a block diagram of an intermediate circuit adaptation device according to one form of embodiment.

FIG. 2 shows a block diagram of an intermediate circuit adaptation device 1. This intermediate circuit adaptation device 1 comprises an intermediate circuit 10, a control unit 20 and a voltage sensor 30. The intermediate circuit 10 has an intermediate circuit voltage and at least two phases. Multiple parallel phases are employed in order to be able to employ smaller and more economical components, and to be able to scale the intermediate circuit more flexibly. The individual phases of the intermediate circuit 10 can be switched on or off as required. The number of phases can thus be changed. The intermediate circuit voltage can furthermore be changed. The change to the intermediate circuit voltage can be changed or adapted discretely, i.e. in specific, predefined steps, e.g. 25 V, or continuously. The control unit 20 can determine the current or expected operating point, and can change the intermediate circuit voltage and/or number of phases on the basis of this operating point. The losses and the cooling power in the intermediate circuit 10 can be reduced in this way, and the range can be increased. The operating point can in particular take the load, such as an electric motor, that is connected to the intermediate circuit 10 into consideration. This can in particular be advantageous, since an electric motor requires a certain minimum voltage in the intermediate circuit 10 for dynamic applications. The intermediate circuit voltage can be changed by the control unit 20 to a value of, for example, between 250 V and 800 V. The control unit 20 can, furthermore, first change the intermediate circuit voltage (which is possible quickly and with high dynamic performance), and then change the number of phases. It is to be noted that the control unit 20 can reduce the intermediate circuit voltage and/or the number of phases when the load demanded from the intermediate circuit 10 falls below a first, predefined threshold value. In other words, if the power demanded from the intermediate circuit 10 is low, the intermediate circuit voltage and the number of phases can be reduced. The control unit 20 can furthermore raise the intermediate circuit voltage and/or increase the number of phases when the load demanded from the intermediate circuit 10 exceeds a second, predefined threshold value. In other words, if the power demanded from the intermediate circuit 10 is high, the intermediate circuit voltage and the number of phases can be increased.

Figure 3:
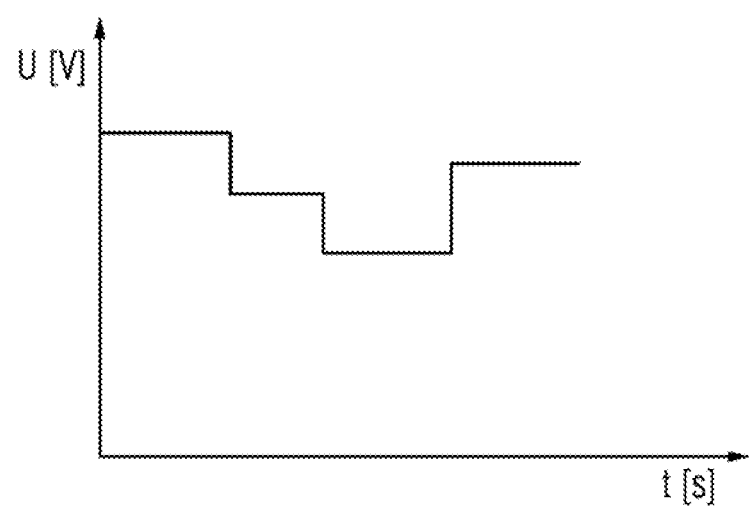
FIG. 3 shows a voltage curve of the intermediate circuit over time, according to one form of embodiment.

FIG. 3 shows a diagram of the intermediate circuit voltage of an intermediate circuit over time. The time in seconds is plotted on the abscissa, and the current intermediate circuit voltage plotted in volts on the ordinate. It can be seen that the intermediate circuit voltage is changed in steps over time. The times between the individual changes and the height of the steps can vary here.

Figure 4:
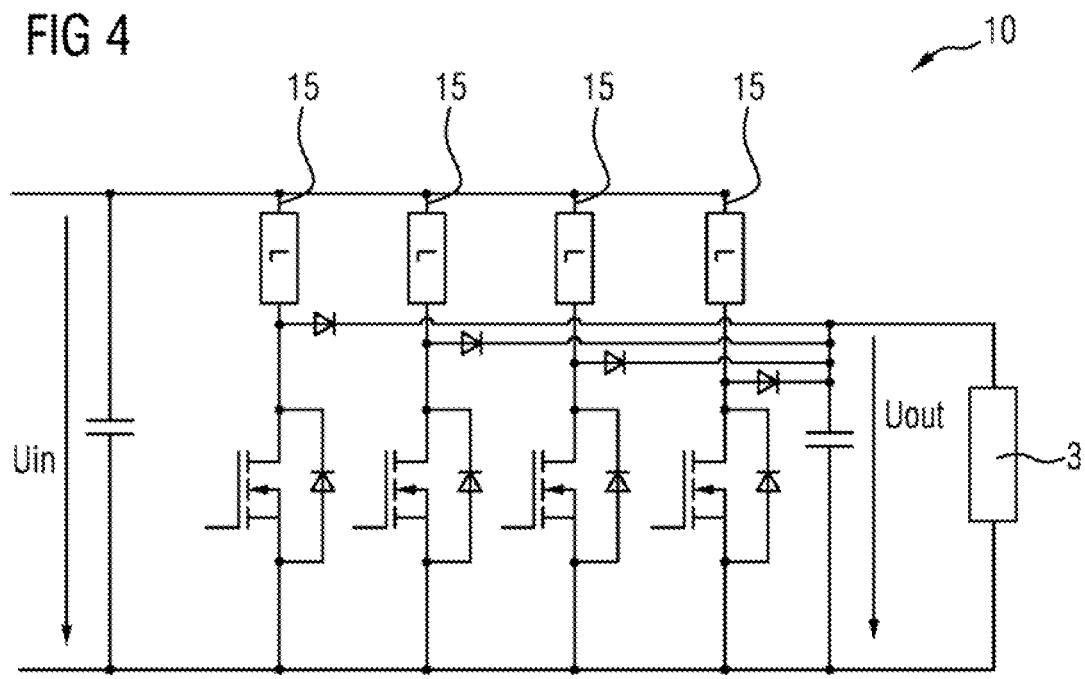
FIG. 4 shows a circuit diagram with a plurality of phases according to one form of embodiment.

FIG. 4 shows a circuit, or an intermediate circuit, 10, with four parallel phases 15. A load 3 that is fed by the intermediate circuit 10 can be seen on the right-hand side. The individual phases 15 can be switched on or off selectively. Each of the phases 15 can comprise a MOSFET in order to switch it on or off. The current of the intermediate circuit 10 is divided between the individual phases 15, so that the phases 15 are loaded symmetrically. It is to be noted that the individual phases 15 can be switched on or off by the control unit of the intermediate circuit adaptation device. This can in particular occur while taking the current operating point into consideration.

Figure 5:
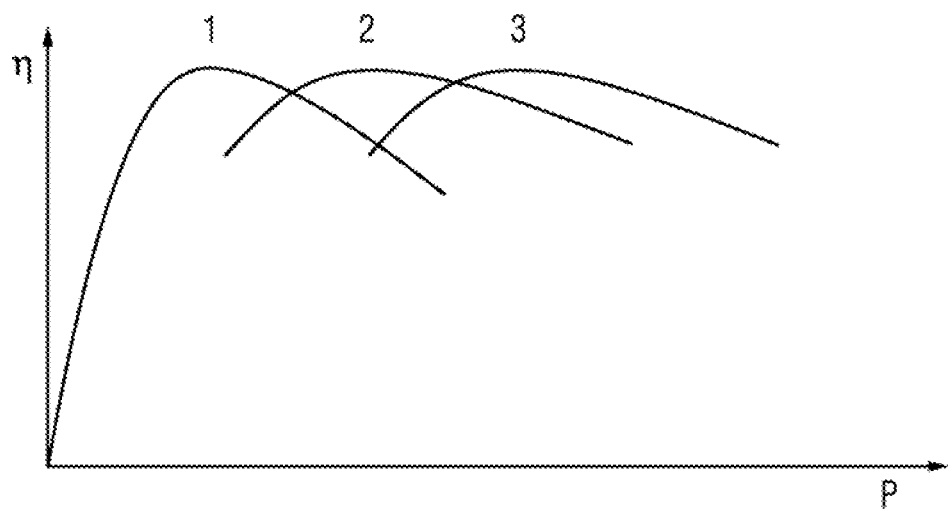
FIG. 5 shows an efficiency diagram of the number of phases against power, according to one form of embodiment of the invention.

FIG. 5 shows an efficiency diagram of the number of phases against power. The efficiency here is plotted along the ordinate (y-axis) and the transmitted power along the abscissa (x-axis). The number of phases is identified by the numbers 1 to 3. It can be seen that more phases are required as the power rises in order to transmit the power into the intermediate circuit, and that the efficiency of the overall system depends on the number of phases. Above a certain power, it is more efficient to use two phases for the transmission (above the respective intersections). When the power is known it is thus possible to discover which number of phases has the highest efficiency. The efficiency can also, furthermore, be plotted against the intermediate circuit voltage, but this is not shown here.

Figure 6:
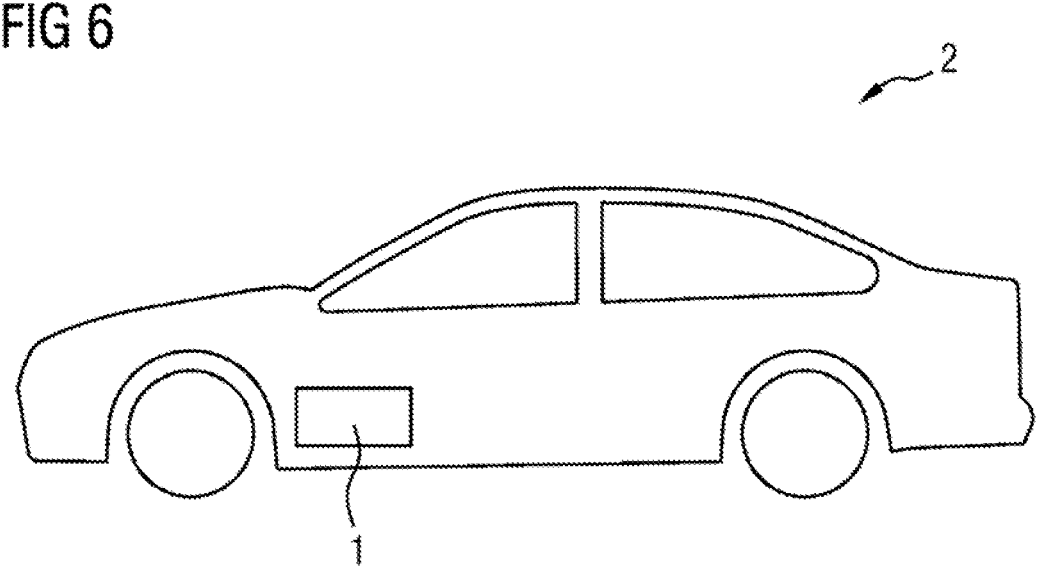
FIG. 6 shows a vehicle with an intermediate circuit adaptation device according to one form of embodiment.

FIG. 6 shows a vehicle 2, in particular an electric vehicle, with an intermediate circuit adaptation device 1. The intermediate circuit voltage and/or the number of phases of the vehicle 2 can hereby be changed depending on the current or expected operating point. The voltage-dependent losses can be minimized by the change to the intermediate circuit voltage. The phase-dependent or current-dependent losses can, furthermore, be minimized through switching individual phases on or off. The overhead for cooling can at the same time be reduced due to the minimized losses. These two effects result in an increased range of the vehicle.

Figure 7:
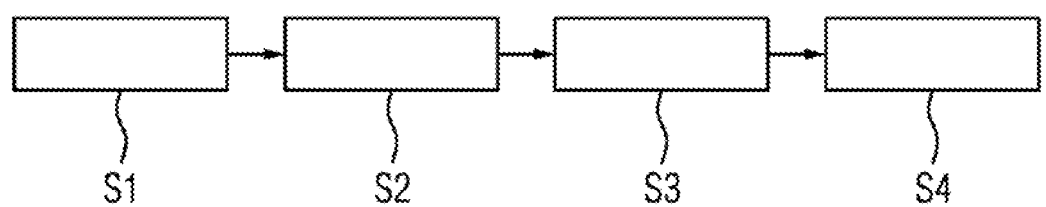
FIG. 7 shows a flow diagram for a method for changing the intermediate circuit voltage and/or the number of phases according to one form of embodiment.

FIG. 7 shows a flow diagram for a method for changing an intermediate circuit voltage and/or a number of phases of a vehicle. The current intermediate circuit voltage is acquired in step S1. This can, for example, be done by means of a voltage sensor. The current or expected operating point is determined in step S2. This operating point can depend on the required power and the minimum necessary voltage, as well as on the driving maneuver. The intermediate circuit voltage is changed (increased or reduced) in step S3, depending on the current or expected operating point. The number of phases is changed in step S4, depending on the current or expected operating point; individual phases are, for example, selectively switched on or off. The losses in the intermediate circuit can thus be minimized, whereby a range of a vehicle can be increased.

The invention claimed is:

1. An intermediate circuit adaptation device for a vehicle, comprising:
a DC intermediate circuit with at least two phases; and
a control unit,
wherein the control unit is configured to change an intermediate circuit voltage and/or a number of the phases of the intermediate circuit on the basis of a current operating point, and
wherein the control unit is configured to change the intermediate circuit voltage in steps.

2. The intermediate circuit adaptation device as claimed in claim 1, wherein the current operating point takes a load connected to the intermediate circuit into consideration.

3. The intermediate circuit adaptation device as claimed in claim 1, wherein the control unit is configured to change the intermediate circuit voltage to a value between 250 V and 800 V.

4. The intermediate circuit adaptation device as claimed in claim 1,
wherein a step height of the stepwise change to the intermediate circuit voltage is 25 V.

5. The intermediate circuit adaptation device as claimed in claim 1, wherein the control unit is configured to first vary the intermediate circuit voltage and then to change the number of phases.

6. The intermediate circuit adaptation device as claimed in claim 1,
wherein the intermediate circuit comprises four phases,
wherein the control unit is configured to lower the intermediate circuit voltage and/or to reduce the number of phases when the load demanded from the intermediate circuit falls below a first, predefined threshold value,
wherein the control unit is configured to raise the intermediate circuit voltage and/or increase the number of phases when the load demanded from the intermediate circuit exceeds a second, predefined threshold value.

7. The intermediate circuit adaptation device as claimed in claim 1, wherein the control unit is configured to change the intermediate circuit voltage and/or the number of phases of the intermediate circuit on the basis of an expected operating point.

8. The intermediate circuit adaptation device as claimed in claim 1, further comprising a voltage sensor to acquire the intermediate circuit voltage.

9. The intermediate circuit adaptation device as claimed in claim 1, wherein the control unit is configured to change a switching frequency of a rectifier, converter or inverter that is connected to the intermediate circuit depending on the current operating point.

10. A vehicle having an intermediate circuit adaptation device as claimed in claim 1.

11. A method for changing an intermediate circuit voltage and/or a number of phases, comprising:
acquiring an intermediate circuit voltage;
determining a current operating point;
changing the intermediate circuit voltage depending on the current operating point; and
changing the number of phases of the intermediate circuit depending on the current operating point.

12. An intermediate circuit adaptation device for a vehicle, comprising:
a DC intermediate circuit with at least two phases; and
a control unit,
wherein the control unit is configured to change an intermediate circuit voltage and/or a number of the phases of the intermediate circuit on the basis of a current operating point, the current operating point selected from the group consisting of a power, a dynamic performance, a peak current, a minimum intermediate circuit voltage, a cooling power, and a heating power.

13. The intermediate circuit adaptation device as claimed in claim 1, wherein a step height of the stepwise change is variable.

* * * * *